Oct. 21, 1941.    C. D. BARTHOLOW    2,259,724
ROAD SWEEPER
Filed Sept. 1, 1939
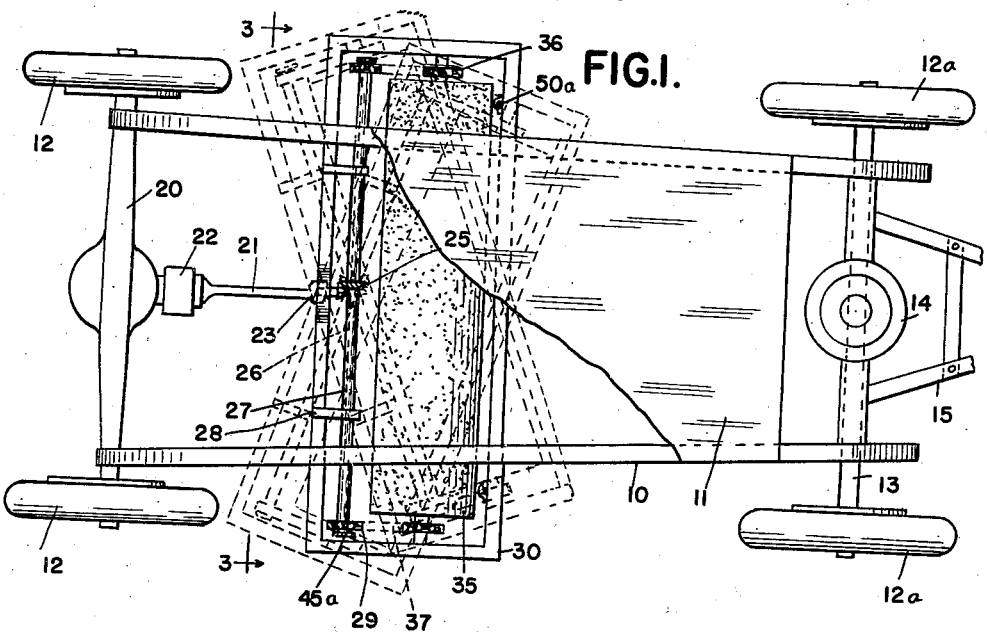
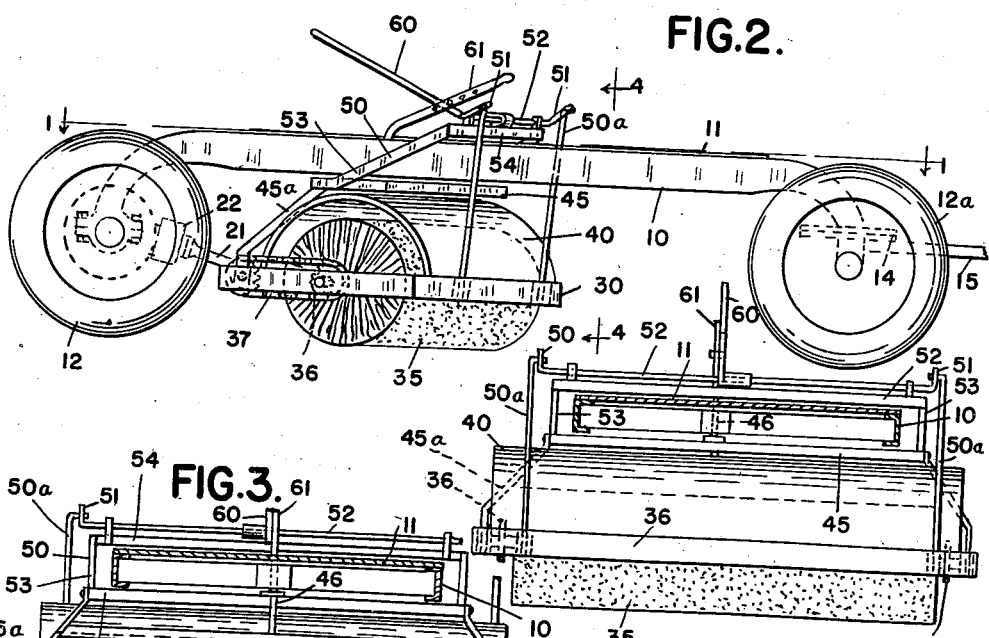
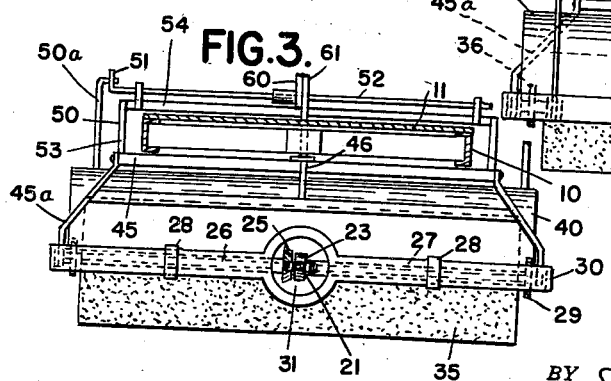
INVENTOR.
CECIL D. BARTHOLOW
BY Swan, Frye & Hardesty
ATTORNEYS Patented Oct. 21, 1941

2,259,724

UNITED STATES PATENT OFFICE 2,259,724

ROAD SWEEPER

Cecil D. Bartholow, Huron, S. Dak.

Application September 1, 1939, Serial No. 293,113

1 Claim. (Cl. 15—82)

The present invention relates to road sweepers and has among its objects a sweeper of the self-driven type, the brush of which is rotated by the moving of the machine.

Another object is a device of the type indicated which is efficient, simple in construction and easy to operate.

Another object is a device of the kind indicated which is provided with a simple unitary control for directing the brush and regulating its vertical position.

Other objects will readily appear to those skilled in the art upon reference to the following description and the accompanying drawing in which Figure 1 is a horizontal sectional view of the sweeper taken on line 1—1 of Figure 2 and showing in dotted lines various angular positions of the brush.

Figure 2 is a side elevation of the machine.

Figure 3 is a vertical sectional view on line 3—3 of Figure 1, and

Figure 4 is a vertical sectional view on line 4—4 of Figure 2.

In the drawing, the machine is shown as comprising a horizontal frame 10 of channel members, or other suitable elements, carrying a platform 11, and mounted upon suitable road wheels 12 and 12a, such as the pneumatic tired wheels indicated.

The front wheels 12a are mounted upon a suitable axle 13 which supports this end of frame 10 by means of a fifth wheel 14 to permit steering and means, such as the hitch frame 15, is also provided for attachment of suitable traction means (not shown).

The rear ends of the members of frame 10 are bent downwardly and fixed directly to the tubular rear axle assembly 20 which is such an assembly as is used as a driving axle for the conventional motor vehicle. In other words, this axle assembly 20 consists of a conventional tubular housing containing at the center a differential gearing assembly from which, to the wheels extend "live" axles to which the wheels 12 are fixed and from which assembly extend forwardly a short shaft to which the propeller shaft 21 is fixed by means of a universal joint 22.

All of this gearing, axle, and propeller shaft assembly may be conventional in construction except that, in the present device, the shaft 21 is driven by rather than being used to drive the wheels 12. The propeller shaft 21, or, as it is more properly called, the drive shaft extends forward to a second universal joint 23 by means of which it is connected to another short shaft provided with a bevel gear drive 25 for cross shaft 26, the gearing and shaft being enclosed in a second tubular housing 27.

The housing 27 is mounted within a horizontal frame 30 and fixed to the rear cross member thereof as by the members 28 than which it is somewhat shorter so as to permit the mounting of sprockets 29 on the ends of shaft 26 within the frame. Further, in order to permit access of the drive shaft 21, a suitable enlargement may be provided at the central portion of the rear frame cross member and this provided with an opening 31.

Also mounted in the frame 30, and journaled therein, is the rotary brush 35, provided at its ends with sprockets 36 in alignment with sprockets 29, chains 37 being used to provide the brush drive.

A suitable cover such as that indicated at 40 may also be provided.

The frame 30 is suspended from frame 10 by means of a yoke 45 and the members 50, the yoke 45 being connected at the lower extremities of its arms 45a through hinge joints to the frame 30 and being suspended from frame 10 by means of a single pin 46 to permit horizontal swinging movement.

It will be noted that the arms 45a of the yoke extend downwardly and rearwardly (see Fig. 2). This is to provide for locating pin 46 at a point substantially directly above the center of mass of the suspended elements.

The forward end of frame 30 is supported by two links 50a attached at their upper ends to crank arms 51 formed at the ends of a shaft 52 rotatably mounted upon an upward extension of yoke 45. This extension is composed of the two arms 53, one on each side of frame 10, and the cross member 54 upon which the shaft 52 is mounted.

The shaft 52 is rotatable by means of a lever 60 to actuate cranks 50 and through these to raise and lower the front end of frame 30 and thereby the brush 35.

The vertical position of lever 60 may be fixed by passing a suitable pin through the lever and an arm 61 rotatably mounted upon platform 11, while the lever may be moved horizontally to determine the angular position of the brush 35.

Now having described the preferred embodiment of the invention, what is claimed is:

A road sweeper comprising a main frame provided with road wheels, a sub-frame carried thereby and mounter to permit at least partial rotation in a horizontal plane, a brush rotatably mounted in said sub-frame, drive means connecting the rear road wheels and said brush whereby to rotate the latter when said sweeper is moved on its wheels, a lever pivotally mounted on said main frame for swinging in a vertical plane and also mounted to swing in a horizontal direction, and means connecting one end of said lever to said sub-frame whereby to raise and lower the latter, said horizontal movement serving to swing said sub-frame horizontally.

CECIL D. BARTHOLOW.